(12) United States Patent
Cippitani

(10) Patent No.: US 10,400,681 B2
(45) Date of Patent: Sep. 3, 2019

(54) RECIRCULATING SYSTEM FOR A FUEL SUPPLY SYSTEM FOR A MOTOR AND METHOD FOR SUPPLYING FUEL TO A MOTOR OF A VEHICLE THROUGH SUCH A SUPPLY SYSTEM

(71) Applicant: ICOMET s.r.l., Cisterna di Latina (IT)

(72) Inventor: Luciano Cippitani, Latina (IT)

(73) Assignee: ICOMET S.R.L., Cisterna di Latina (IT)

( * ) Notice: Subject to any disclaimer, the term of this patent is extended or adjusted under 35 U.S.C. 154(b) by 0 days.

(21) Appl. No.: 15/313,016

(22) PCT Filed: May 18, 2015

(86) PCT No.: PCT/IT2015/000133
§ 371 (c)(1),
(2) Date: Nov. 21, 2016

(87) PCT Pub. No.: WO2015/193924
PCT Pub. Date: Dec. 23, 2015

(65) Prior Publication Data
US 2017/0159582 A1    Jun. 8, 2017

(30) Foreign Application Priority Data

May 22, 2014    (IT) .............................. RM2014A0262

(51) Int. Cl.
*F02D 19/02*    (2006.01)
*F02D 19/06*    (2006.01)
(Continued)

(52) U.S. Cl.
CPC ....... *F02D 19/0613* (2013.01); *F02D 19/021* (2013.01); *F02D 19/022* (2013.01);
(Continued)

(58) Field of Classification Search
CPC combination set(s) only.
See application file for complete search history.

(56) References Cited

U.S. PATENT DOCUMENTS

2012/0279590 A1*  11/2012  Wilkinson ......... F02M 37/0052
                                                    137/563

FOREIGN PATENT DOCUMENTS

WO    WO 2011059316 A1 *   5/2011   ......... F02D 19/0647

* cited by examiner

*Primary Examiner* — Grant Moubry
*Assistant Examiner* — Ruben Picon-Feliciano
(74) *Attorney, Agent, or Firm* — Muncy, Geissler, Olds & Lowe, P.C.

(57) ABSTRACT

The present invention relates to a method for supplying fuel for a motor of a vehicle by a fuel supply system comprising: a first tank for containing a first fuel; supply means for supplying fuel to the motor; a supply line, for allowing said first fuel to pass from said first tank to said supply means; a return line, for allowing fuel to pass from said supply means to said first tank; a recirculating line, connected with said supply line and said return line, for allowing fuel to pass from said return line to said supply line; and valve means, configured to selectively direct fuel from said return line to said supply line by said recirculating line, or to said first tank; wherein said method comprises the steps of controlling the speed vehicle; controlling the vehicle motor load; defining a first threshold value of the vehicle speed; defining a second threshold value for the vehicle motor load; letting said first fuel passing from said first tank to said supply means through said supply line, and from said supply means to said first tank through said return line, preventing passage of fuel along said recirculating line, when the vehicle speed is lower than said first threshold value and/or motor load is lower than said second threshold value; or making said first fuel passing from said first tank to said supply means
(Continued)

through said supply line and then through a closed circuit comprising a part of said return line, said recirculating line and a portion of said supply line, permitting passage of said first fuel through said recirculating line, so that said first fuel arrives again within said supply means, when the vehicle speed is higher than said first threshold value and motor load is higher than said second threshold value, so as to prevent an excessive increase within said first tank caused by inlet within the first tank of the first fuel warm arriving from said supply means.

5 Claims, 3 Drawing Sheets

(51) Int. Cl.
*F02M 21/02* (2006.01)
*F02M 37/00* (2006.01)

(52) U.S. Cl.
CPC ..... *F02D 19/0644* (2013.01); *F02D 19/0647* (2013.01); *F02D 19/0665* (2013.01); *F02D 19/0676* (2013.01); *F02M 21/023* (2013.01); *F02M 21/0206* (2013.01); *F02M 21/0215* (2013.01); *F02M 21/0221* (2013.01); *F02M 21/0236* (2013.01); *F02M 37/0023* (2013.01); *F02M 37/0047* (2013.01); *F02M 37/0052* (2013.01); *F02M 37/0088* (2013.01); *F02D 2200/02* (2013.01); *F02D 2200/501* (2013.01); *F02M 21/0212* (2013.01); *Y02T 10/32* (2013.01); *Y02T 10/36* (2013.01)

RECIRCULATING SYSTEM FOR A FUEL SUPPLY SYSTEM FOR A MOTOR AND METHOD FOR SUPPLYING FUEL TO A MOTOR OF A VEHICLE THROUGH SUCH A SUPPLY SYSTEM

BACKGROUND OF THE INVENTION

Field of the Invention

The present invention refers to a recirculating system for a fuel supply system for a motor and to a method for supplying fuel to a motor of a vehicle through such a supply system.

Fuel supply method according to the invention can be advantageously used for supplying different fuels such as LPG, DME, ammonia and similar fuels.

The above method can be further advantageously used for supplying direct or indirect injection, traditional injection or common rail injection gasoline and diesel motors.

In the following the specification will be addressed to a supply system and to a supply method for a gasoline and LPG motor of a vehicle, but it is well evident that the same must not be considered limited to the use with this type of specific fuels, being it possible using them also with fuels different with respect to those indicated in the following specification.

Brief Discussion of the Related Art

In vehicles provided with a gasoline or diesel supplied with a traditional LPG supply system, LPG to be always maintained at the liquid state, if not used by the motor, must necessarily return to the tank to prevent its gasification and thus it occurs that when the vehicle is running, LPG contained within the vehicle tank tends to progressively increase its temperature due to the residual LPG that, from high pressure pump or from injector rail returns, hot, to the tank.

For example, it is observed that after a journey of only some hours. LPG temperature within the vehicle tank could even pass 70° C.

Increase of LPG temperature within the tank unavoidably means a corresponding increase of pressure, up to pressure values that could even pass maximum allowed threshold (20 bar) for delivering LPG by LPG station to make supplying.

Therefore, in case LPG pressure within the vehicle tank passes the above threshold, it would be absolutely impossible supplying LPG.

At present, average LPG delivery pressure in LPG station is usually within the range between 12 bar and 15 bar.

This means that if pressure of LPG within the vehicle tank passes 15 bar, station pump cannot transfer LPG to the tank.

Recently it has been thought overcoming said problem by controlling a temporary switching of motor supply from LPG to gasoline, when an excessive LPG temperature increase occurs, in order to obtain a progressive lowering of the temperature, and thus of the LPG pressure within the tank until when the motor is supplied with gasoline.

However, in this case the driver would be obliged to make one or more parts of his/her journey with motor supplied with gasoline instead that with LPG, as he/she could prefer to reduce fuel costs.

BRIEF SUMMARY OF THE INVENTION

In view of the above, it is therefore object of the present invention that of providing a method for supplying fuel to a vehicle motor, permitting refueling anytime, i.e. anytime it is necessary.

Another object of the present invention is that of providing a method for supplying fuel to a vehicle motor, permitting switching from a fuel to another one in a simple and efficient way.

It is therefore specific object of the present invention a method for supplying fuel for a motor of a vehicle by a fuel supply system comprising: a first tank for containing a first fuel; supply means for supplying fuel to the motor; a supply line, for allowing said first fuel to pass from said first tank to said supply means; a return line, for allowing fuel to pass from said supply means to said first tank; a recirculating line, connected with said supply line and said return line, for allowing fuel to pass from said return line to said supply line; and valve means, configured to selectively direct fuel from said return line to said supply line by said recirculating line, or to said first tank; wherein said method comprises the steps of controlling speed vehicle; controlling vehicle motor load; defining a first threshold value of vehicle speed; defining a second threshold value for vehicle motor load; letting said first fuel passing from said first tank to said supply means through said supply line and from said supply line to said first tank through said return line, preventing passage of fuel along said recirculating line, when the vehicle speed is lower than said first threshold value and/or motor load is lower than said second threshold value; or making said first fuel passing from said first tank to said supply means through said supply line and then through a closed circuit comprising a part of said return line, said recirculating line and a portion of said supply line, permitting passage of said first fuel through said recirculating line, so that said first fuel arrives again within said supply means, when the vehicle speed is higher than said first threshold value and motor load is higher than said second threshold value, so as to prevent an excessive increase within said first tank caused by inlet within the first tank of the first fuel warm arriving from said supply means.

Preferably, according to the invention, said first fuel can be LPG.

Further, according to the invention, said first speed threshold value can be of about 30 km/h and second motor load threshold can be about 20%.

Advantageously, according the invention, said fuel supply system can comprise a second tank for containing a second fuel and a feed line to connect said second tank to said supply line; said method eventually comprising the further step of making said first fuel passing from said supply means through a closed circuit comprising a portion of said return line, said recirculating line and a portion of said supply line, permitting passage of said first fuel through said recirculating line, so that said first fuel again arrives in said supply means, when a switching is inputted from said first fuel to said second fuel for supplying said motor.

Still according to the invention, said further step can be actuated until substantially completely consuming said first fuel within said closed circuit.

Furthermore, according to the invention, said second fuel can be gasoline.

It is also an object of the present invention a method for supplying fuel to a vehicle motor by a fuel supply system comprising: a first tank for containing a first fuel; a second tank for containing a second fuel; supply means for supplying fuel to the motor; a supply line, for allowing said first fuel to pass from said first tank to said supply means; a feed line for connecting said second tank to said supply line; a return line, for allowing fuel to pass from said supply means to said first tank; a recirculating line, connected with said supply line and said return line, for allowing fuel to pass from said return line to said supply line; and valve means, configured to selectively direct fuel from said return line to said supply line by said recirculating line, or to said first tank; wherein said method comprises the step of permitting said first fuel passing from said supply means through a closed circuit, comprising a part of said return line, said recirculating line and a portion of said supply line, permitting passage of said first fuel through said recirculating line, so that said first fuel arrives again within said supply means, when a switching is carried out from said first fuel to said second fuel to supply said motor.

BRIEF DESCRIPTION OF THE DRAWINGS

The present invention will be described, for illustrative, but not limitative, purposes according to its preferred embodiments, with particular reference to the figures of the enclosed drawings, wherein.

DETAILED DISCUSSION OF THE PREFERRED EMBODIMENTS

In the different figures, the same reference numbers will be used for similar parts.

Figure 1:
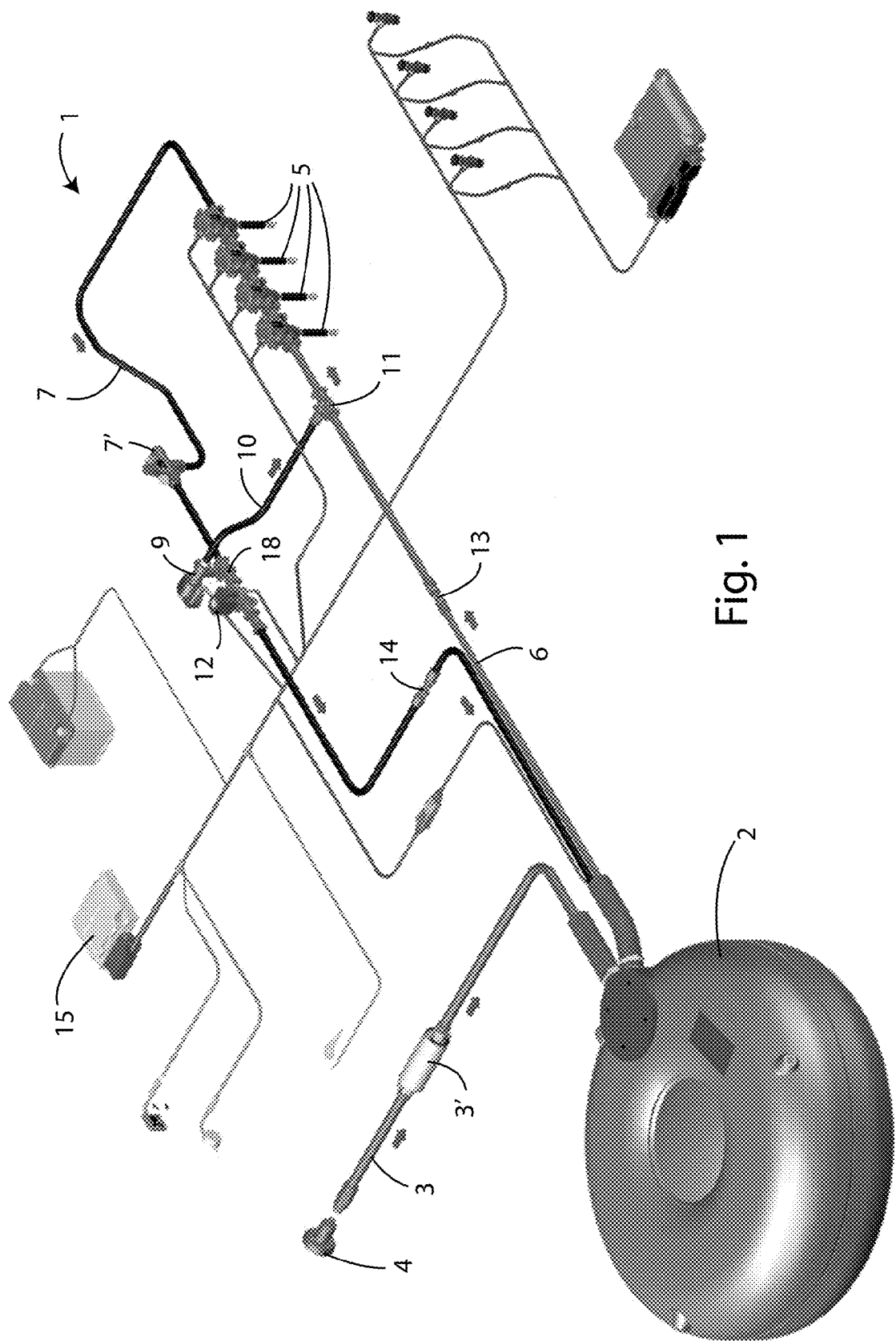
FIG. 1 shows a method scheme for a LPG and gasoline supply system for an indirect injection, common rail motor according to the invention.

Making reference to FIG. 1, by reference 1 it is indicated a LPG and gasoline supply system for an indirect injection common rail motor of a vehicle.

Said system 1 comprises a LPG tank 2, lined at the bottom with an insulating material layer, such as rock wool, to insulate the same with respect to vehicle silencer heat.

An intake tube 3 engages in said tank 2, said tube 3 providing an intake filter 3' and an intake port, i.e. a nozzle 4, at one end, to permit LPG refueling with any LPG station.

System 21 further comprises a series of LPG injectors 5 connected to LPG tank 2 by supply tube 6 and fit to inject LPG within the vehicle motor intake manifold.

LPG tank 2 provides a drawing pump (not shown) to push LPG from said tank 2 to injectors 5 and a secondary recirculating tube (not shown) coupling the supply tube 6 with the same tank 2.

Further, a safety electro valve is present in tank 2 to interrupt LPG flow exiting from said tank 2 when the vehicle motor is switched off.

A return tube 7 is provided from LPG injectors 5 to tank 2 to permit return of residual LPG (not used by motor) to tank 2.

A pressure adjuster 7' is mounted don return tube 7, to adjust pressure within said return tube 7, and a first three way joint 8 provided with an inlet communicating with the above injectors 5, a first exit and a second exit.

A first electro valve 9 is mounted on first exit of first three way joint 8, with the relevant exit connected with supply tube 6 by a recirculating tube 10 and a second three way joint 11 for connection of the latter on said supply tube 6.

A check valve (not shown) is installed on the recirculating tube 10, permitting LPG flow only from return tube 7 to supply tube 6, and preventing the flow in the opposed direction.

A second electro valve 12 is present on return tube 7, installed upward the first three way joint 8, so that inlet and exit of said second electro valve 12 communicate, respectively, with the exit of said first three way joint 8 and LPG tank 2.

Along part of the supply tube 6 between tank 2 and second three way joint 11 and on part of the return tube 7 between second electro valve 12 and tank 2, they are, respectively, provided a first removable connection member 13 and a second removable connection member 14, to permit separation of tank 2 from the remaining part of system 1.

System 1 comprises, further to original vehicle control unit, a control unit 15 connected, by suitable connection wirings, to the above mentioned drawing pump, to the tank 2 electro valve, to injectors 5, to first electro valve 9 and to second electro valve 12 to control and manage its operation.

Above control unit 15 is further configured to steadily control motor speed and load of vehicle during it running, by motor vehicle load being meant an exploitation index of the motor power with respect to nominal power.

Control unit 15 is connected to common rail 16 communicating with gasoline tank 17, to control injection of gasoline to vehicle motor.

With motor low operating regime, i.e. when control unit 15 detects that vehicle speed is lower than a first threshold value and/or motor load is lower than a second threshold value, first electro valve 9 remains closed while second electro valve 12 is open, so that, combustion residual LPG, after passing from tank 2 to injectors 5 through supply tube 6, (when not used by motor) is returned from injectors 5 to the same tank 2, through the return tube 7.

Lower regime operation described in the above inevitably determines a progressive increase of temperature, and consequently of pressure, of LPG contained within tank 2, since hot LPG remaining from combustion is passed from injectors 5 directly to tank 2.

To prevent excessive increase of LPG temperature and pressure within tank 2, that would jeopardize possibility of refueling with any LPG station, control unit 15, when detecting that vehicle speed passes first threshold value and motor load passes second threshold value, provides opening of the first electro valve 9 and, at the same time, closure of the second electro valve 12, thus making combustion residual LPG passing through the return tube 7 part between injectors 5 and first three way joint 8, then through recirculating tube 10 and, finally, through supply tube part between second three way joint 11 and injectors 5.

Opening the first electro valve 9 and closing at the same time second electro valve 12 it is thus realized a continuous recirculation of liquid LPG through injectors 5.

Thus, temperature and pressure values of LPG within tank 2 progressively reduce since tank 2 does no more receive hot LPG returning from injectors.

When vehicle speed falls below the first threshold value and/or motor load falls below the second threshold value since power is not required to the motor and fuel consumptions are very low, control unit 15 controls again closure of first electro valve 9 and the contemporaneous opening of second electro valve 12, in order to prevent LPG gasification.

In fact, when the system operates again at very low motor operating regime (i.e. when vehicle speed is under the first threshold value and/or the motor load is under the second threshold value), LPG must return from injectors 5 to tank 2, since, otherwise, continuous recirculating of the same residual LPG amount would cause its gasification, and consequently malfunction of the system 1.

As soon as both set speed and motor load threshold values are again passed, control unit 15 provides again LPG recirculating, opening electro valve 9 and closing at the same time second electro valve 12.

Also operations of drawing pump and of secondary recirculating tube of tank 2 described in the above will depend on system 1 operative conditions, i.e. operation with or without recirculation, and of the present LPG demand from vehicle motor.

In fact, when LPG recirculation is provided in system 1, drawing pump delivers a LPG flow rate from tank 2 lower than the one delivered in case system 1 operates under standard conditions, i.e. without recirculation.

Thus, operation of system 1 is managed by control unit 15 according to the above modes, on the basis of set speed and motor load values, to prevent rising of temperature and pressure of LPG contained within tank 2.

Figure 2:
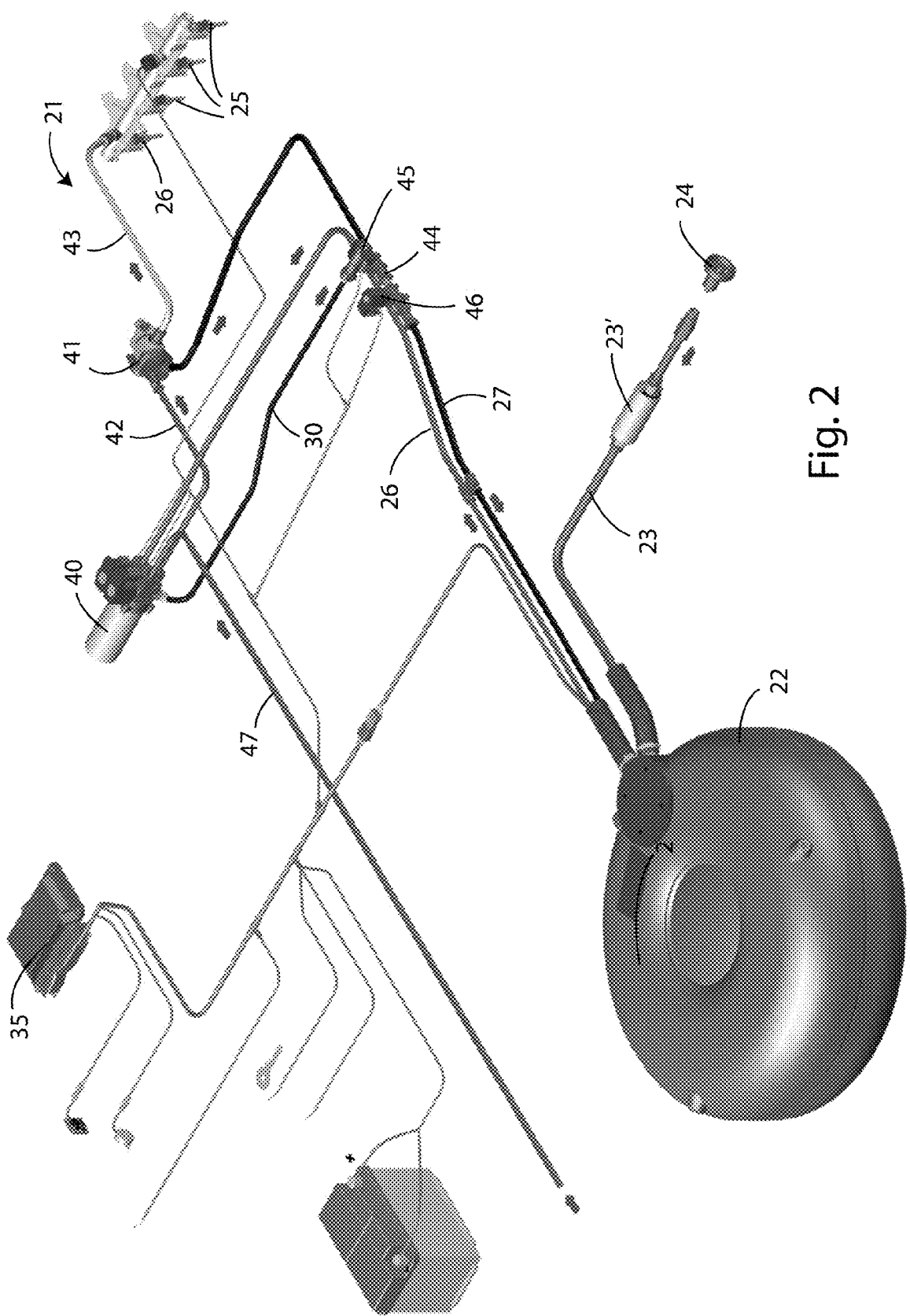
FIG. 2 shows a method scheme for a LPG and gasoline supply system for a direct injection, motor according to a first arrangement of the invention.

Making now reference to FIG. 2, by reference number 21 it is indicated an LPG and gasoline supply system for a direct injection motor according to a first arrangement.

In this case too, system 21 provides an LPG tank 22 and an intake tube 23 provided with an intake filter 23' and an intake opening, i.e. a nozzle 24, connected each other as described with reference to system 1.

System 1 further comprises a gasoline and LPG dispenser, provided with its own pump and connected to the LPG tank 22 by a supply tube 26, and a high pressure pump 41, connected to said dispenser 40 by a first coupling tube 42 and to a series of injectors 25 for direct injection within combustion chamber, by a second connection tube 43.

Then, high pressure pump 41 is in flow communication with LPG tank 22, by a return tube 27, on which it is joined, a three way joint 44, a recirculating tube 30 connected to dispenser 40 and having a first electro valve 45 controlled by control unit 15. A check valve (not shown) is provided on recirculating tube 30, suitable to permit LPG flow only from return tube 27 to dispenser 40, preventing its flow according to the opposite direction.

A second electro valve is also installed on return tube 27, provided downward said three way joint 44 and controlled by said control unit 15.

Further, a supply tube is connected to dispenser 40, for gasoline arriving from a gasoline tank 48, in order to permit supply of gasoline to injectors 25, in case of malfunction of gasoline motor.

Operation of the system for direct injection motor 21 is substantially the same of that for system for common rail motor 1 described in the above.

In fact, also in this case, when system 21 is operating under standard conditions, i.e. when motor operates at low regime (i.e. when vehicle speed is lower than a first threshold value and/or motor load is lower than a second threshold value), LPG in excess with respect to the motor demand is returned by high pressure pump 41 directly to tank 22, through return tube 27.

Instead, when control unit 35 detects that during operation of motor both threshold values set for speed and motor load have been passed (e.g. 30 km/h as speed threshold value and 20% as motor load threshold value), recirculating of LPG is provided by opening first electro valve 45 and contemporaneous closure of second electro valve 46, until when at least one between vehicle speed and motor load falls below the relevant threshold value.

Therefore, when operating under a LPG recirculating mode, LPG exiting from high pressure pump 41 is sent back to dispenser 40, through return tube 27 part provided between said high pressure pump 41 and three way joint 44 and through the above recirculating tube 30.

Then, LPG is returned from dispenser 40 again to high pressure pump 41, through said first connection tube 42.

A further advantage of system 21 is due to the fact that, when switching from LPG supply to gasoline supply, it is possible obtaining cleaning of circuit of said system, simply providing LPG recirculation by opening said first electro valve 45 and at the same time closure of second electro valve 46, without the need of sending gasoline within tank 22.

In fact, in the latter case, providing LPG recirculation to supply motor until complete LPG consumption circulating long the system part interested by recirculation, complete cleaning of said system part is obtained, practically setting the same to receive new fuel, i.e. gasoline.

Figure 3:
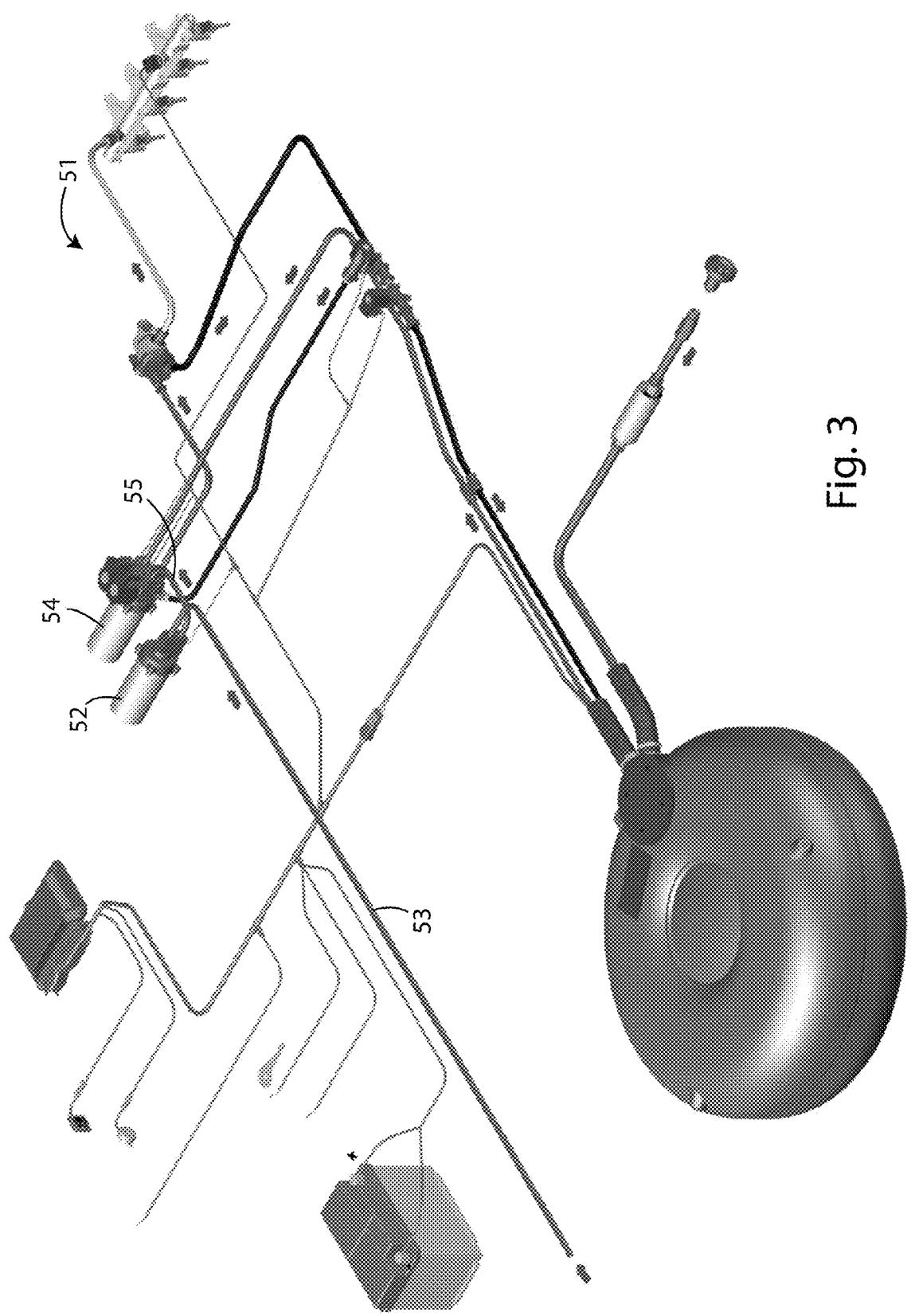
FIG. 3 shows a method scheme for a LPG and gasoline supply system for a direct injection, motor according to a second arrangement of the invention.

Making now reference to FIG. 3, by reference number 51 it is indicated an LPG and gasoline supply system for a direct injection motor according to a second arrangement, that is identical to the arrangement shown in FIG. 2 apart from the fact that system 51 further comprises a supplementary pump for gasoline 52, in which gasoline supply tube 53 couples, said tube arriving from gasoline tank 58, and that is coupled to gasoline and LPG dispenser 54 by a further connection tube 55.

In the above direct injection motor system 21 and 51, LPG recirculation as described in the above can be advantageously activated during switching of motor supply from LPG to gasoline, to ensure a proper switching.

In fact, recirculating during said switching possible LPG not used as yet by vehicle motor, it is prevented its gasification, permitting its complete consumption, without creating problems to systems 21, 51 operation.

Making reference to the direct injection motor system 51, LPG recirculation can be also activated during starting of the motor according to a particular procedure providing a first step, wherein second electro valve 46 is maintained closed for a set time period while first electro valve 45 is maintained open during the same period, and a second step, immediately after said first step, during which second electro valve 46 is open again and first electro valve 45 is closed.

While starting the motor, LPG recirculation can be alternately provided according to a second procedure providing a first step, during which second electro valve 46 is maintained closed for a set time period while first electro valve 45 is at the same time maintained open for the same time period, and a second step, immediately following said first step, during which alternate opening and closure of second electro valve 46 are provided, at 0.5 second time intervals, for a total time period equal to the first step.

Present invention has been described for illustrative, but not limitative, purposes, according to its preferred embodiments, but it is to be understood that variations and/or modifications can be introduce by those skilled din the art without departing from the relevant scope as defined in the enclosed claims.

The invention claimed is:

1. A method for supplying fuel for a motor of a vehicle by a fuel supply system comprising:
    a first tank for containing a first fuel, which is LPG, or DME or ammonia;
    supply means for supplying fuel to the motor;
    a supply line, for allowing said first fuel to pass from said first tank to said supply means;
    a return line, for allowing fuel to pass from said supply means to said first tank;

a recirculating line, connected with said supply line and said return line, for allowing fuel to pass from said return line to said supply line; and valve means, configured to selectively direct fuel from said return line to said supply line by said recirculating line, or to said first tank;

wherein said method comprises the steps of:

controlling the speed of the running vehicle;

controlling the motor load of the running vehicle;

defining a first threshold value of the vehicle speed;

defining a second threshold value for the vehicle motor load;

when the vehicle speed is lower than said first threshold value and/or the motor load is lower than said second threshold value, controlling the valve means to flow said first fuel from said first tank to said supply means through said supply line, and from said supply means to said first tank through said return line, thereby preventing passage of fuel along said recirculating line; and when the vehicle speed is higher than said first threshold value and the motor load is higher than said second threshold value, controlling the valve means to flow said first fuel from said first tank to said supply means through said supply line and then through a closed circuit comprising a part of said return line, said recirculating line and a portion of said supply line, thereby permitting passage of said first fuel through said recirculating line and preventing said first fuel from returning to said first tank, so that said first fuel arrives again within said supply means, so as to prevent an excessive increase within said first tank caused by inlet within the first tank of the first fuel warm arriving from said supply means, wherein said fuel supply system comprises a second tank for containing a second fuel and a feed line to connect said second tank to said supply line; said method comprising the further step of making said first fuel passing from said supply means through a closed circuit comprising a portion of said return line, said recirculating line and a portion of said supply line, permitting passage of said first fuel through said recirculating line, so that said first fuel again arrives in said supply means, when a switching is inputted from said first fuel to said second fuel for supplying said motor.

2. The method according to claim 1, wherein said first fuel is LPG.

3. The method according to claim 1, wherein said first speed threshold value is of about 30 km/h and second motor load threshold is about 20%.

4. The method according to claim 1, wherein said further step is actuated until substantially completely consuming said first fuel within said closed circuit.

5. The method according to claim 1, wherein said second fuel is gasoline.

* * * * *